Figure 1:
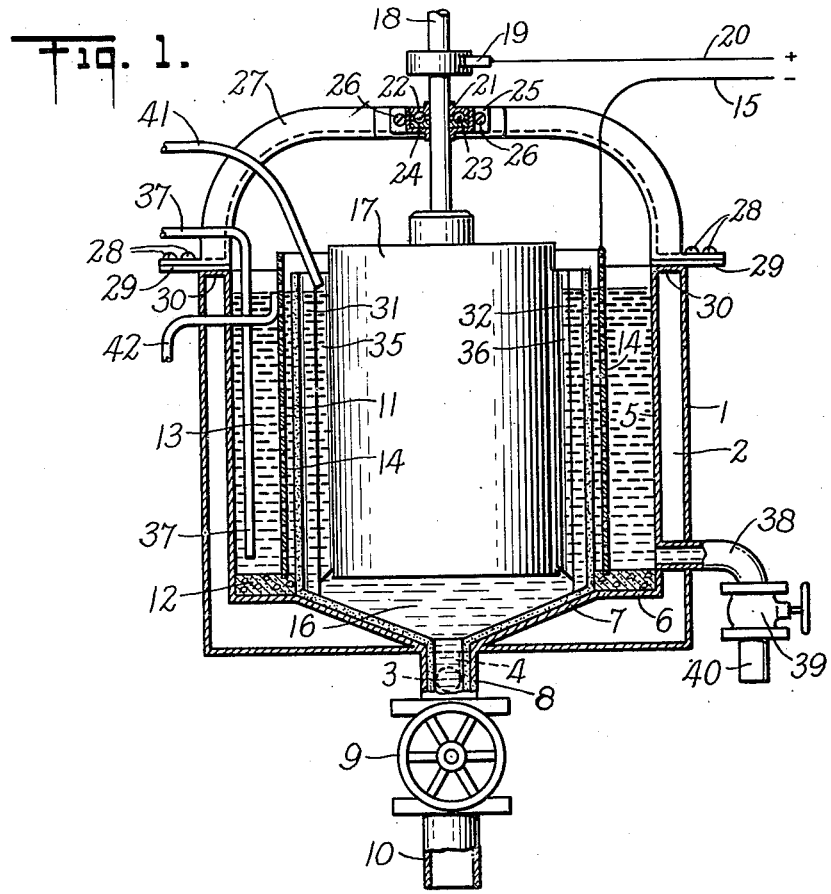

Aug. 5, 1952    M. J. PORTANOVA ET AL    2,606,148

PROCESS FOR ELECTROLYTIC PREPARATION OF VANADIUM OXIDE

Filed Nov. 2, 1948

INVENTORS
Mario J. Portanova
Arthur Rosinger
BY
Arthur Wright
ATTORNEY

Patented Aug. 5, 1952

2,606,148

UNITED STATES PATENT OFFICE 2,606,148

PROCESS FOR ELECTROLYTIC PREPARATION OF VANADIUM OXIDE

Mario J. Portanova, Brooklyn, N. Y., and Arthur Rosinger, Belleville, N. J., assignors to Natural Products Refining Co., Jersey City, N. J., a corporation of Delaware Application November 2, 1948, Serial No. 57,864

4 Claims. (Cl. 204—96)

1

Our invention relates to the process of preparing vanadium oxide, $V_2O_5$, by the electrolysis of sodium vanadate, $NaVO_3$, solutions and the apparatus used therein.

One of the objects of our invention is the manufacture of a high purity vanadium oxide, and another object is to provide an electrolytic cell for enabling the process to be carried out in an effective and practical way, with an alkali-metal vanadate.

In the practice of this invention the sodium vanadate solution used for electrolysis may be obtained in any desired way. For example, the said vanadate solution may be produced by leaching out the roast made by heating or fusing under oxidizing conditions any vanadium-bearing material or ore with one or more alkali-metal compounds such, for instance, as sodium carbonate, sodium hydroxide, potassium carbonate, potassium hydroxide or mixtures thereof in any desired proportions. Another way of obtaining the sodium vanadate solution may be by dissolving any vanadium-bearing material or ore in an oxidized state in aqueous solutions of alkali-metal compounds such as sodium hydroxide, sodium carbonate, potassium hydroxide, potassium carbonate or mixtures thereof, in any desired proportions. These methods of obtaining the sodium or other alkali-metal vanadate solutions for treatment by our process are, of course, previously well known. For example, we can prepare a sodium vanadate solution from a vanadium-bearing material such as a crude sodium polyvanadate obtained as a by-product of various industries. This impure sodium polyvanadate is dissolved in caustic soda solution or other alkali-metal compounds in solution. Such treatment of a crude sodium polyvanadate or other impure vanadium-bearing material in the oxidized state has the advantage that any impurities insoluble in alkaline solutions can be separated from the soluble sodium vanadate by filtration or settling before electrolysis.

The crude sodium polyvanadate referred to may, for instance, be that which is obtained as a product in the recovery of uranium from uranium ores, for instance by roasting uranium ore containing vanadium compounds as an impurity with an alkali-metal compound such, for example, as sodium carbonate, sodium hydroxide, potassium carbonate, potassium hydroxide or mixtures thereof, in any desired proportions, to produce an alkali uranium compound and then treating the product thus obtained with sulfuric acid of any desired strength, but for instance

2 sulfuric acid containing 23% by weight of water, to precipitate out the crude sodium polyvanadate. The sodium polyvanadate is usually a mixture of variable proportions of the following acids, partly dehydrated, with the sodium salts thereof:

Orthovanadic acid, $OV(OH)_3$
Metavanadic acid, $VO_2(OH)$ and ofttimes, also, one or both of the following acids, partly dehydrated, with the sodium salts thereof:

Pyrovanadic acid, $VO(OH)_2.O.VO.(OH)_2$
Tetravanadic acid,
$VO(OH)_2.O.VOOH.O.VOOH.OVO(OH)_2$ Previous electrolytic methods of treating the sodium vanadate solutions to produce vanadium oxide resulted in obtaining a vanadium oxide containing considerable amounts of sodium compounds and other impurities such as lime and silica, and, furthermore, the use of anodes of platinum, which has previously been said to be the only metal that will resist the electrolytic oxidation at the anode, has made the previous methods impractical and too expensive.

An object of our invention, therefore, is to provide an electrolytic cell by means of which the process above referred to can be effectively accomplished and in which anodes and cathodes of an effective character, made of readily available materials, are utilized, and in which, by means of a rotating anode the vanadium oxide may be effectively removed continuously in the process by scraping the precipitated vanadium oxide therefrom. Another object is to control the concentrations, temperatures, and current densities in the process to enable these advantageous objects to be attained.

While our invention is capable of being carried out in many different ways and with many different types of apparatus, by way of example we have shown only one embodiment of the apparatus in the accompanying drawings, in which—

Figure 2:
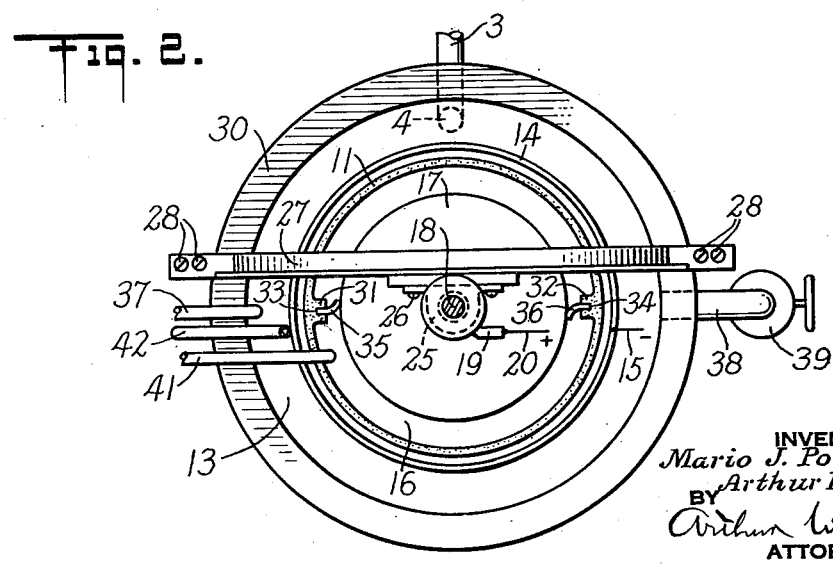

Fig. 1 is a vertical section of an electrolytic cell used in accordance with our invention; and Fig. 2 is a plan view of the same.

The present process, by employing the type of apparatus hereinafter described together with the conditions of proper concentration and subsequent repulping of the vanadium oxide, results in the manufacture of a high grade product containing even as much as 97% vanadium oxide, the remaining 3% being substantially comprised of sodium oxide. This product compares favorably in composition with the best previously obtainable product of the highest available purity on the market. One of the important features of our invention, furthermore, is utilizing steel instead of platinum as the anode material, as we have discovered that steel, contrary to previous knowledge, will withstand effectively the corrosive electrolytic action at the anode owing to the formation of a protective film of oxide of iron thereon. The making of the anode of steel or iron, or of iron alloys containing carbon and silicon, such as cast iron, etc., makes this process especially practical and feasible for the manufacture of vanadium oxide commercially. In fact, by this means any water soluble alkali-metal vanadium compound may be effectively electrolyzed to produce the vanadium oxide by our process.

As an example in carrying out the process, and means which may be utilized in carrying out this invention, the crude sodium or potassium polyvanadate may be converted to a soluble sodium or other alkali-metal vanadate by digesting it with a caustic soda solution or other alkali-metal compound in aqueous solution. The said caustic soda solution or other alkali-metal compound aqueous solution may contain any desired percentage of water, but for instance from ½% to 10% by weight of water. The solution is preferably adjusted to a pH of 7.0 by using a slight excess of alkali polyvanadate. The insoluble impurities are then filtered off. The filtrate is then set to a concentration of .06 gr. of vanadium oxide per cc. (.078 gr. NaVO₃ per cc.). This solution is now run into the anode chamber of a two-compartment cell, constructed as hereinafter described. The cathode chamber is filled with a caustic soda solution which is preferably weak, having a 1% strength for instance.

The two-compartment electrolytic cell is, for example, provided with an outer hollow cylindrical steel vessel 1 having an annular chamber 2 therein forming a jacket for the introduction of any desired heating medium, as for example steam, which may be supplied thereto by means of a pipe 3 having an inlet 4 connected to the bottom of the cylindrical vessel 1, and which may also serve as a means for drawing off any condensed water therefrom. The chamber 2 has an inner cylinder 5 connected to a flat annular bottom portion 6 provided with a conical lower central portion 7, which leads to a draw-off pipe 8 having a valve 9 communicating with an outlet pipe 10. A porous porcelain cylindrical diaphragm 11 is set into the bottom of the cylinder 5 in an annular concrete layer 12, and a conical continuation of the said porcelain cylinder 11 extends downwardly over the conical steel bottom 7 and into the draw-off pipe 8 up to the position of the valve 9. This porous porcelain diaphragm cylinder 11 has, provided on the outside thereof, a cathode chamber 13 in which there is a perforated cylindrical steel sheet 14, which may, instead, however, be of copper, carbon or Monel metal, to serve as a cathode, which is connected to an electrical conduit or wire 15. Within the porous diaphragm cylinder 11 there is also formed an anode chamber 16 having therein a rotating solid cylindrical steel or iron anode 17. The anode 17 may be made of some other metal, for instance platinum, but not so advantageously. The anode 17 may be carried on a shaft 18 which is rotated by means of any suitable source of power and has a conducting cylinder thereon carrying a stationary brush 19 which is connected by a wire 20 to the source of electric current to which the wire 15 also leads. The said shaft 18 has securely fastened thereto a bearing member 21 having beneath the same a ball race 22 to receive balls 23 supported in a stationary ball race 24, to act as a thrust bearing for supporting the shaft 18, by being carried within an insulating fibre clamping block 25 secured by screws 26 to a yoke 27, the lower downwardly directed ends of which are flanged and fastened by screws 28 to flanges 29 located on the top of a horizontal annular cover plate 30 which connects the walls 1 and 5, forming the chamber 2 located between the same. The porcelain cylindrical diaphragm 11, furthermore, has on its inner face two vertical flanges 31 and 32 provided with vertical slots 33 and 34, respectively, for receiving therein scrapers 35 and 36, made of any desired insulating inert flexible or plastic material so that the inner edges thereof rub against the rotating steel anode 17 to remove the vanadium oxide, which forms thereon during the electrolysis.

In the cathode chamber 13 there is a vertical supply pipe 37 and connected to said chamber there is also a draw-off pipe 38 having a valve 39 connected to a pipe 40 for carrying off the discharged liquid. Furthermore, in the anode chamber 16 there is a supply pipe 41. The cathode chamber 13 may be provided with an overflow pipe 42, if desired.

In the operation of our process, the outlet valves 9 and 39 of the cell being in closed position, the cathode chamber 13 is filled with the weak caustic soda solution comprising, preferably, a solution of 1% by weight of sodium hydroxide in water, by means of the pipe 37. The anode chamber 16 is then filled, by means of the pipe 41, with the sodium vanadate solution, that is to say containing the crude sodium polyvanadate obtained as above and having the strength above referred to, as for instance a concentration of .06 gr. of vanadium oxide per cc. (.078 gr. NaVO₃ per cc.). The temperature is then raised to about 60 to 90° C., but preferably 90°, by means of the steam and then maintained in this range. The anode 17 is rotated at any desired speed, but for example at about 1 R. P. M. Direct current is then applied to the electrodes, said current being of any desired character, but for example of 25 to 35 amperes per square foot of anode surface at 6 to 8 volts. The vanadium oxide, $V_2O_5$, is thus formed on the outer surface of the anode 17 and this is continually being removed by the scrapers 35, 36 as the anode is rotated, in a loose granular form so that it falls to the bottom and is easily removed through the valve 9, after which it can be filtered and repulped by suspending it in water and washing it in any desired manner. The end of the electrolysis is shown by a sudden drop of amperage, at which time the anolyte in the chamber 16 containing the suspended vanadium oxide is drawn off for further processing, as above referred to. The cell 16 can then again be filled with fresh sodium vanadate solution and the electrolysis repeated. The electrolysis of each batch is preferably continued, in the manner above described, until about 75% of the vanadium present is precipitated as vanadium oxide, at which point the sudden drop in amperage will take place. Preferably, also, the precipitated vanadium oxide is filtered to separate it from the mother liquor. Thereafter, it is then suspended in water, as above referred to, in any desired proportion, which may be, for instance, about 10 gr. of vanadium oxide per 100 cc. of water, and stirred at a temperature of about 90 to 100° C. for at least ¾ of an hour. If the vanadium oxide is precipitated from a sodium vanadate solution containing the equivalent of .06 gr. vanadium oxide per cc. of the solution or less, and if the vanadium oxide produced is repulped under the conditions described above, the resulting dry vanadium oxide will have a purity of about 97% $V_2O_5$, and will contain a minimum amount of sodium salts. The mother liquor containing the unprecipitated vanadium oxide and other soluble salts, such as sodium uranate, may be concentrated, cooled and treated to recover vanadium oxide. The solution may then be filtered and the vanadium oxide added to a fresh batch of vanadium bearing material in the oxidized state. This mixture is then dissolved in caustic soda solution to form soluble sodium vanadate, as previously described for the preparation of the anolyte.

It will be understood that in conducting the process, as the vanadium oxide forms at the anode the cathode liquor will increase in alkalinity. If desired, the catholyte in the chamber 13 can be drawn off after each batch removal of the vanadium oxide, or can be continuously removed by running water into the chamber 13 at a slow rate from any suitable source of fresh water supply and allowing the caustic soda solution which has been formed during the electrolysis, to overflow by means of the discharge pipe 42.

The caustic soda which is produced at the cathode can, furthermore, be used to dissolve a fresh batch of the oxidized vanadium-bearing material, as for instance the uranium ore containing vanadium, above referred to. In this way, the caustic soda necessary for the solution of the vanadium-bearing material can be used over again repeatedly in the process.

If desired, the vanadium oxide precipitated and repulped as above, can be rendered anhydrous by drying, at a temperature of 300° C., for example.

While we have described our invention above in detail we wish it to be understood that many changes may be made therein without departing from the spirit of the same.

We claim:

1. An electrolytic process for obtaining vanadium oxide, comprising subjecting an alkali metal vanadate water solution to electrolytic action with the aid of a steel anode so as to obtain a precipitate of vanadium oxide substantially free from iron, at a concentration adjusted to approximately .078 gram of sodium vanadate per cc. at a pH of 7.0 and a cathode in a catholyte of a weak caustic soda solution, with a direct current density of approximately 25 to 35 amperes per square foot of the anode at 6 to 8 volts and a temperature of about 60-90° C.

2. An electrolytic process for obtaining vanadium oxide, comprising subjecting an alkali-metal vanadate water solution to electrolytic action with the aid of a steel anode so as to obtain a precipitate of vanadium oxide substantially free from iron, at a concentration adjusted to approximately .078 gram of sodium vanadate per cc. at a pH of 7.0 and a cathode in a catholyte of a weak caustic soda solution, with a direct current density of approximately 25 to 35 amperes per square foot of the anode of 6 to 8 volts and a temperature of about 60-90° C., filtering off the precipitated vanadium oxide from the anode liquor, repulping the vanadium oxide with water at a temperature of 90-100° C. for at least ¾ of an hour and then filtering and drying the purified vanadium oxide.

3. An electrolytic process for obtaining vanadium oxide, comprising subjecting an alkali-metal vanadate water solution to electrolytic action with the aid of a steel anode so as to obtain a precipitate of vanadium oxide substantially free from iron at a concentration adjusted to approximately .078 gram of sodium vanadate per cc. at a pH of 7.0 and a cathode in a catholyte of a weak caustic soda solution, with a direct current density of approximately 25 to 35 amperes per square foot of the anode at 6 to 8 volts and a temperature of about 60-90° C., the electrolysis being continued until about 75% of the vanadium present is preciditated as vanadium oxide when a sudden drop in amperage takes place.

4. An electrolytic process for obtaining vanadium oxide, comprising subjecting an alkali-metal vanadate water solution to electrolytic action with the aid of a steel anode so as to obtain a precipitate of vanadium oxide substantially free from iron, at a concentration adjusted to approximately .078 gram of sodium vanadate per cc. at a pH of 7.0 and a cathode in a catholyte of a weak caustic soda solution, with a direct current density of approximately 25 to 35 amperes per square foot of the anode at 6 to 8 volts and a temperature of about 60-90° C., the electrolysis being continued until about 75% of the vanadium present is precipitated as vanadium oxide when a sudden drop in amperage takes place, filtering off the precipitated vanadium oxide from the anode liquor, repulping the vanadium oxide with water at a temperature of 90-100° C. for at least ¾ of an hour and then filtering and drying the purified vanadium oxide.

MARIO J. PORTANOVA.
ARTHUR ROSINGER.

REFERENCES CITED

The following references are of record in the file of this patent:

UNITED STATES PATENTS

| Number | Name | Date |
|---|---|---|
| 1,050,796 | Bleecker | Jan. 21, 1913 |
| 1,322,000 | Ellis | Nov. 18, 1919 |
| 1,435,886 | Acton et al. | Nov. 14, 1922 |
| 1,719,984 | Klein et al. | July 9, 1929 |
| 1,807,585 | Becker | June 2, 1931 |
| 2,448,848 | Van Loenen | Sept. 7, 1948 |

OTHER REFERENCES

"Comprehensive Treatise on Inorganic and Theoretical Chemistry," by Mellor, vol. 9 (1929), pages 750, 753.

"Transactions of The American Electrochemical Society," vol. 30 (1916), pages 175–221.

"Electrolytic Oxidation and Reduction," by Glasstone et al. (1936), pages 114–117, 333, 334.

"Kolloid Zeitscrift," vol. 30 (1922), pages 346–348.